March 17, 1964   J. B. McCARTHY CLIFTON   3,125,726
APPARATUS FOR CONVERTING D.-C. POWER TO A.-C. POWER
Filed Aug. 7, 1958   2 Sheets-Sheet 1
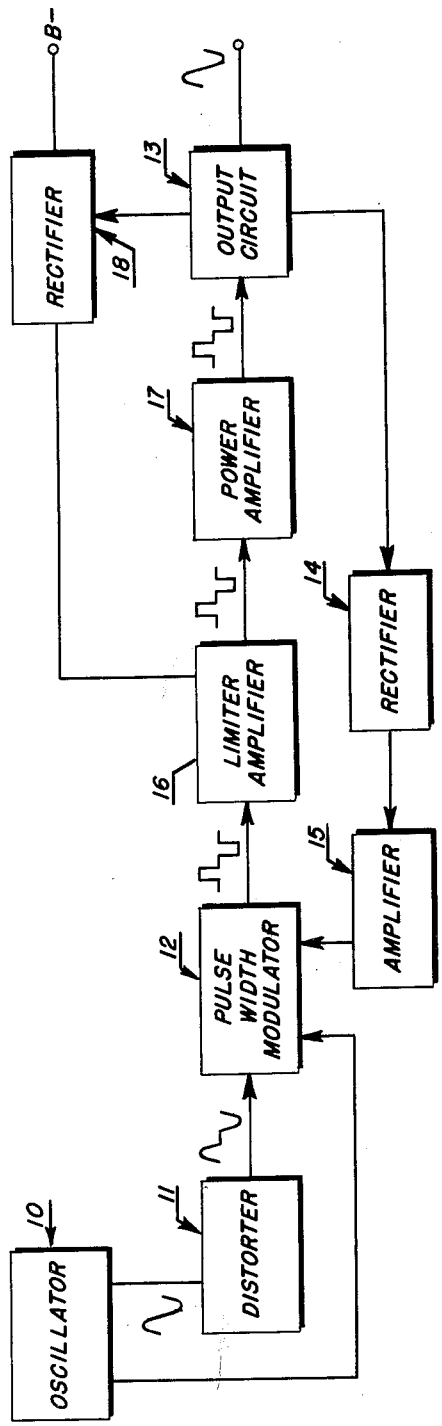
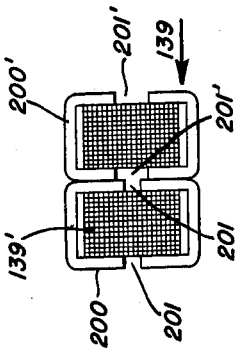
JAMES BERNARD MC CARTHY CLIFTON
INVENTOR.
BY *Rudolph J. Quick*
ATTORNEY

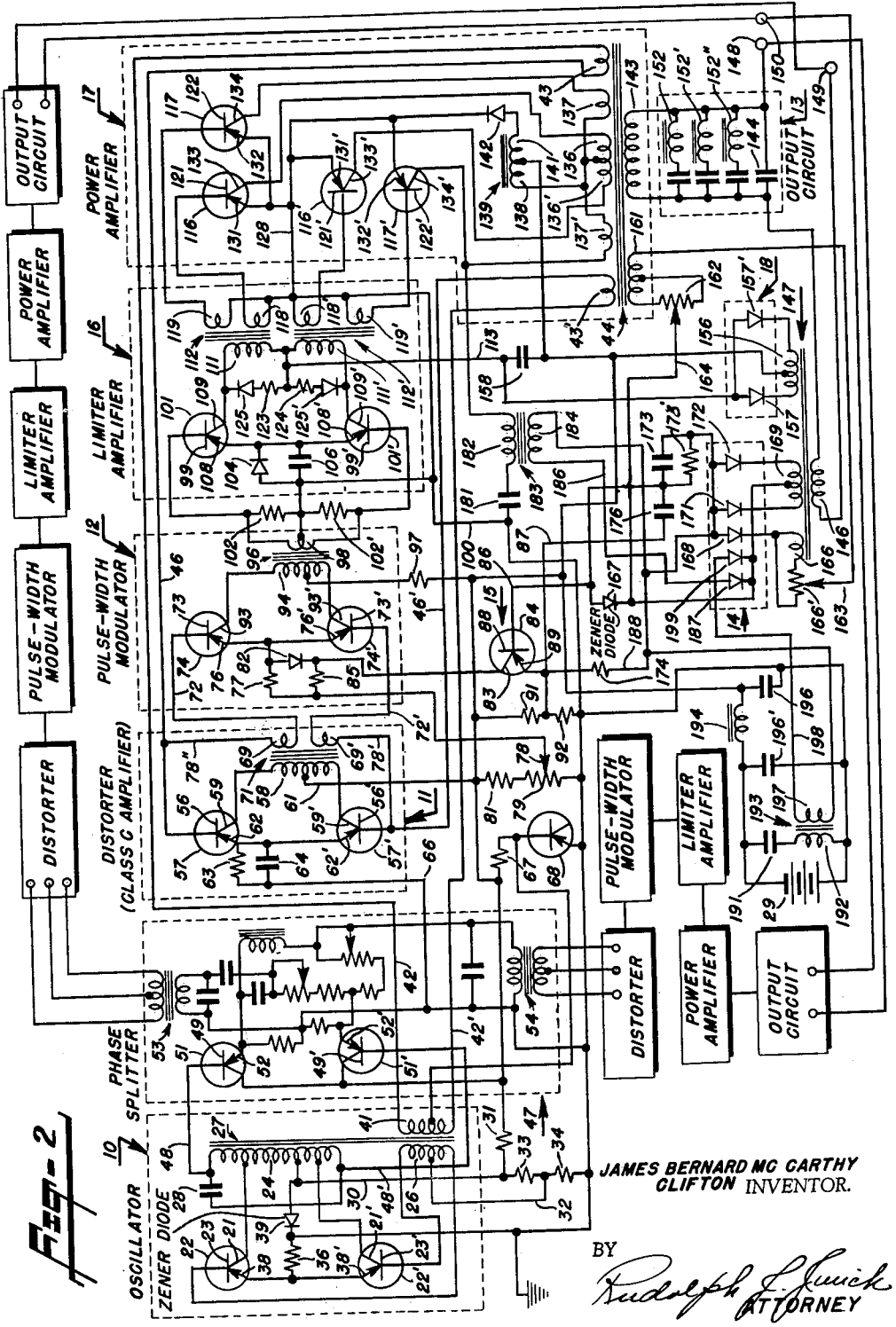

3,125,726
Patented Mar. 17, 1964

3,125,726
APPARATUS FOR CONVERTING D.-C. POWER TO A.-C. POWER
James Bernard McCarthy Clifton, Red Bank, N.J., assignor to The Bendix Corporation, Eatontown, N.J., a corporation of Delaware
Filed Aug. 7, 1958, Ser. No. 753,737
Claims priority, application Great Britain Aug. 12, 1957
24 Claims. (Cl. 328—22)

This invention relates to an apparatus for converting D.-C. power to A.-C. power, which apparatus may be used as a radio transmitter, inverter, or like device.

For purposes of explanation, my invention is described with reference to an inverter for use as an alternating current power source. Some prior art inverters for converting direct current to alternating current involve the use of mechanical type vibrators having vibrating contacts and other movable parts. Other mechanical type inverters employ rotating dynamoelectric machines. Movable, mechanical devices involve problems of inertia, bearing wear, arcing, and the like. To avoid the shortcomings of such prior art mechanical type inverters, all-electronic type inverters are used which include vacuum tubes, gas-filled tubes, semi-conducting devices, and the like. However, where size, weight and reliability are of importance, such as, for use in aircraft and missile applications, most of the prior art devices are lacking in one or more of the requirements.

An object of this invention is the provision of a lightweight inverter for converting D.-C. to A.-C. power which includes a plurality of push-pull arrangements employing semi-conductor devices, such as transistors, therein.

An object of this invention is the provision of an inverter, or like device, which includes no mechanically moving parts, and which is capable of supplying a wide range of output currents at a constant output voltage and frequency.

An object of this invention is the provision of an inverter having a high efficiency under all values of loading.

An object of this invention is the provision of a device having a generally square wave current input and sinusoidal voltage output, the said device including a feedback arrangement comprising a series connected inductor and rectifier, the said feedback arrangement reducing the transient voltage produced at the input of the device to a safe value to prevent breakdown of the device.

An object of this invention is the provision of a push-pull pulse width modulator operating in a switching mode and having an output of negative and positive going pulses of relatively small duration, which are accurately controlled by supplying the modulator with an input waveform of a distorted sine wave shape having a slope in the vicinity of the positive and negative peaks which is of increased steepness compared to that of a sine wave.

An object of this invention is the provision of an inductor, or swinging choke, having at least two parallel magnetic circuits, each of which saturates at different inductor currents.

An object of this invention is the provision of means supplying a variable driving E.M.F. to a power amplifier working in the switching mode in accordance with the required power output therefrom, which means includes a transformer having a primary winding in series with the amplifier output circuit, one transformer secondary winding being arranged to feed a rectifier-filter system for the production of a D.-C. control voltage, the said D.-C. control voltage being added to the D.-C. supply voltage of an amplifier driving the power amplifier so as to increase the drive to the power amplifier when the power output demand therefrom increases.

An object of this invention is the provision of a power amplifier stage which includes a tank circuit tuned to the frequency of output required and comprising a parallel connected inductor and capacitor, and series connected capacitor and inductance elements connected across the tank circuit, which elements are tuned to resonance with the harmonics of the tank resonant frequency.

An object of this invention is the provision of an arrangement which includes solid state switching devices, the said arrangement including means whereby a backward bias of sufficient magnitude is made available to equal or exceed the cut off bias of such solid state switching devices whereby the arrangement may be safely operated at temperatures higher than the highest possible operating temperature of prior art arrangements also including solid state switching devices.

An object of this invention is the provision of first and second amplifiers each connected in a push-pull arrangement, and separate transformers coupling the two halves of the push-pull amplifier arrangements together.

An object of this invention is the provision of an amplifier connected in a push-pull arrangement, and separate input transformers for supplying separate alternating current inputs to each half of the push-pull arrangement, the reverse voltage available at the transformer secondary windings during the relaxation period corresponding to the off condition of the transformers providing a reverse bias to prevent runaway of the push-pull amplifier arrangement.

An object of this invention is the provision of an electronic apparatus having a power output and comprising, a pulse width modulator having an A.-C. signal applied thereto, a biasing potential connected to the said modulator and biasing the same, and means varying the biasing potential in accordance with both the current and the voltage of the output of the apparatus.

An object of this invention is the provision of an electronic apparatus having a power output and comprising, a pulse width modulator having an A.-C. signal applied thereto, a biasing potential connected to the said modulator and biasing the same, and means varying the biasing potential in accordance with the current output of the apparatus, only when the current output reaches a predetermined minimum value.

An object of this invention is the provision of an electronic apparatus including a power amplifier having an input and output circuit, a pulse width modulator having an input and output circuit, an A.-C. signal source connected to the input circuit of the modulator, means connecting the pulse width modulator output circuit to the input circuit of the said power amplifier, a variable biasing potential connected to the said pulse width modulator and biasing the same, and means varying the biasing potential in accordance with excessive transient potentials in the power amplifier output circuit.

An object of this invention is the provision of an electronic apparatus including a pulse width modulator having an input and output circuit, an A.-C. signal source connected to the said input circuit, a D.-C. supply potential source connected to the apparatus, a variable biasing potential connected to the said pulse width modulator and biasing the same, and means varying the biasing potential in accordance with excessive transient potentials in the said D.-C. supply potential source.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a block diagram of a single phase inverter embodying my invention;

FIGURE 2 is a schematic circuit diagram of a three-phase inverter; and

FIGURE 3 is a diagrammatic presentation of a novel inductor device used in the inverters shown in FIGURES 1 and 2.

The inverter of my invention comprises, essentially, an oscillator having a substantially sine wave output. Novel circuit means, including a pulse width modulator and limiting amplifier, are used in the production of symmetrical positive and negative pulses of the same repetition frequency as the sine wave oscillator output, which positive and negative going pulses are separated by intervals, or dwell periods, of substantially no output. The negative and positive pulses, which are closely controlled in width, are fed to a power amplifier from which the useful alternating current output is obtained. A feedback arrangement, which includes a novel swinging choke is included in the power amplifier circuitry whereby a minimum value of inductance is maintained for all values of current which the apparatus is required to furnish. Semiconductor devices, such as transistors, having three contact electrodes, are preferably used throughout the inverter, which devices are included in a plurality of balanced or push-pull arrangements.

Reference is made to FIGURE 1, of the drawings, wherein there is shown in block diagram a single phase inverter embodying my invention and comprising an oscillator 10 having a generally sine wave output of 400 cycles per second, for example, when the device is used as an A.-C. power source in an aircraft. One output from the oscillator 10 preferably feeds a distorter 11. Another output from the oscillator 10 preferably feeds a pulse width modulator 12, together with the output from the distorter. In practice, the distorter comprises an amplifier operating in the class C mode whereby the distorter output comprises generally alternate positive and negative going pulses separated by intervals of substantially zero output. The distorter output and oscillator output are combined in the pulse width modulator 12, comprising a transistor amplifier which includes a pair of transistors connected in a push-pull arrangement. The pulse width modulator 12 is operated in an over-biased class B mode by application of a controllable backward D.-C. bias on the transistors; the source of backward D.-C. bias for the pulse width modulator including an output signal from the output circuit 13 of the inverter, which signal is rectified and amplified by a rectifier and D.-C. amplifier 14 and 15, respectively, and thence applied to the pulse width modulator. It will be apparent that with an over-biased class B mode of operation, the width of the pulse width modulator output pulses is controllable by simply varying the bias on the transistors.

In a modification of the invention, pulse width control is obtained by operating the pulse width modulator 12 in an underbiased class B mode by application of a controllable forward D.-C. bias on the transistors included therein. The forward bias on the push-pull arrangement of transistors operating in an underbiased class B mode is controlled in such a manner that both transistors are driven towards saturation simultaneously during the dwell period between positive and negative pulses so that their output in the secondary of an output transformer included in the push-pull arrangement cancels out during that portion of the time of one cycle when this simultaneous forward drive obtains. Relatively narrower pulses are then obtained when the forward bias supplied by the amplifier 15 is increased.

In the operation of the inverter (for either the over-biased or underbiased class B mode of operation of the pulse width modulator) it is desirable to control the pulse width down to small angles of only several degrees. If a sine wave input were applied to the pulse width modulator, it will be understood that the D.-C. bias to the modulator stage would be very critical in obtaining an output of pulses of very narrow pulse width. With my invention, controllable pulses of small pulse width angles are obtained from the pulse width modulator with a less critical adjustment of the D.-C. bias thereto, by distorting the sine wave input thereto from the oscillator 10 by the signal from the distorter 11. The signal from the distorter 11 adds to the sine wave signal from the oscillator 10 to provide an input signal to the pulse width modulator which is of increased slope, or steepness, in the vicinity of the positive and negative peaks thereof, compared to a sine wave input alone. The output from the pulse width modulator, therefore, comprises alternate negative and positive going pulses which are accurately, and easily, and smoothly controlled in width by means of a D.-C. bias applied thereto from the inverter output through the rectifier 14 and D.-C. amplifier 15.

The controllable pulses from the pulse width modulator are applied to a limiter amplifier 16. The output from the limiter amplifier comprises separate positive and negative going approximately square waves having a pulse width equal to the width of the pulses applied to the input thereof from the pulse width modulator. The square wave outputs from the limiter amplifier drive a power amplifier 17, which may comprise one or more stages of push-pull amplifier arrangements operating in a switching mode. The output from the power amplifier 17 is connected to the resonant output circuit 13. If more than one push-pull amplifier arrangement is incorporated in the power amplifier, the stages are connected in parallel to the resonant output circuit. The power amplifier 17 includes a novel inductor, or swinging choke, and rectifier arrangement for limiting the maximum voltage applied to the power amplifier transistors.

The resonant output circuit 13 offers a high impedance to the fundamental frequency which may be, for example, 400 cycles per second, and at the same time, reduce the harmonic output to a minimum. Obvious advantages accrue from the use of such a resonant output circuit, one such advantage being that the impedance thereof is reduced to a low value at each harmonic frequency likely to be present. In addition, lightweight and small components may be used therein.

In inverters, and the like, which include a power amplifier operating in the switching mode, such as, the power amplifier 17, it is necessary to provide a predetermined minimum drive to the power amplifier stage for a given value of power output required therefrom, the minimum power amplifier input power requirements rising with increased output power taken therefrom. For many applications, the power output required from the inverter may vary from time to time, wherein maximum power output may be required at one time, and less than maximum at another. Under such conditions, it may be undesirable to supply full drive power to the power amplifier when less than full available power output is required. Another important feature of my invention includes an arrangement wherein a D.-C. supply voltage for the limiter amplifier 16, which drives the power amplifier 17, is made to vary directly in accordance with the power output requirements of the inverter. To this end, I obtain an output from the resonant output circuit 13 (which output is proportional to the power output of the resonant output circuit), and rectify the same by means of a rectifier 18. This variable output is added to the constant D.-C. supply potential to the limiter amplifier 16 whereby the actual supply potential thereto varies in accordance with the output demands of the inverter.

Reference is now made to FIGURE 2 of the drawings wherein there is shown a three-phase inverter which comprises, essentially, three single phase inverters of the type shown in FIGURE 1, operating at the same frequency but at a phase angle of 120 degrees each from the other. Two phases of the three phase system are shown in block diagram form, since they have identical counterparts shown schematically in the one phase section. The inverter illustrated utilizes transistors which provide many advantages over electron tubes since transistors are small, have a long, useful life, and require no heater power. While junction transistors of the p-n-p type are shown, it will be understood that the invention is not limited to one particular type of transistor, since junction transistors of the n-p-n type are also siutable.

In FIGURE 2, the oscillator 10 is basically a pair of grounded emitter type amplifiers, each with feedback by means of mutual inductance coupling from the collectors 21 and 21' of the transistors 22 and 22' to the bases 23 and 23', respectively, through the tapped transformer secondary winding 26 of a transformer 27. A capacitor 28 is connected in parallel across the winding 24 to form a parallel resonant circuit, which is resonant at a frequency of 400 cycles per second in the illustrated inverter. It will be understood that the device of my invention is not limited, however, to operation at any particular frequency or to being controlled by any particular type of oscillator. A negative source of potential 29 is connected to the collectors 21, 21' through the tap on the transformer winding 24, a lead wire 30, and an isolating resistor 31. The source of potential 29 is also connected to the bases 23, 23' through the tap on the transformer winding 26, lead wire 32, and a voltage divider comprising the resistors 33 and 34 connected across the supply source 29 through the isolating resistor 31. An emitter biasing resistor 36 is connected between the common connection between the emitters 38 and 38' of the transistors 22 and 22', respectively, and the positive, or common connection, of the negative supply source 29. A Zener diode 39 in the collector circuits between the center tap on the winding 24 and common ground connection limits the maximum collector feed potential.

The transformer 27 includes a second secondary winding 41 for coupling a portion of the sine wave output from the oscillator 10 to both the distorter 11 and pulse width modulator 12. The connection from the winding 41 includes the lead wires 42 and 42' which are connected through feedback windings 43 and 43' on the power amplifier output transformer 44 in the power amplifier 17, to the distorter 11 and pulse width modulator 12 through the lead wires 46 and 46'. An input to the distorter and pulse width modulator, therefore, includes the algebraic sum of the oscillator output and a feedback signal from the power amplifier 17. The feedback provided by the feedback windings 43 and 43' is a negative feedback arrangement which is desirable in a three phase system to reduce the divergence from the 120 degrees phase relation of the output phases under adverse loading conditions. Shifting of the 120 degree phase relation between the three-phase output under various unbalanced capacitive or inductive loading conditions is thereby reduced.

For a three phase system, as shown in FIGURE 2, the oscillator output is also fed to a phase splitter 47; the oscillator output for the phase splitter being derived from connections across the resonant circuit which includes the winding 24 and capacitor 28 in the oscillator. Such connections include lead wires 48 and 48' connected directly to the bases 49 and 49' of a pair of transistors 51 and 51', respectively, connected in push-pull arrangement in the phase splitter 47. The transistor outputs, from the emitters 52 and 52' feed a phase splitting network of conventional design. Outputs from the phase splitting network are obtained from transformers 53 and 54 contained therein. The phase splitter outputs are 120 degrees out of phase, with each other, and with the output from the winding 41 in the transformer 27, for a three phase system. Since the inverter stages from the distorter to the output thereof are identical for each phase of the three phase system, two phases (namely, those fed by the phase splitter transformers 53 and 54), are shown in block diagram form.

It will here be noted, that throughout the entire inverter, the push-pull arrangement of transistors is utilized, and that from the distorter 11 through the power amplifier 17, the transistor push-pull arrangements are operated in a switching mode. Further, a base drive for the transistors is preferably utilized, since less power input is required than with emitter driven transistors.

As seen in the schematic circuit portion of the FIGURE 2 drawing, the input to the distorter 11 from the lead wires 46 and 46' is connected to the bases 56 and 56' of a pair of distorter transistors 57 and 57', respectively. In addition to the transistors 57 and 57', the distorter includes a center-tapped transformer primary winding 58 connected to the collectors 59 and 59'. The negative supply potential source 29 is connected through a lead wire 61 to the center tap of the primary winding 58. The emitters 62 and 62' are connected together and through a parallel connected biasing resistor 63 and bypass capacitor 64 to the common ground connection through the lead 66. The backward biasing potential developed across the resistor 63 and capacitor 64 is sufficient to cause the distorter to function in a mode similar to that of an untuned class C amplifier whereby the output obtained across separate transformer secondary windings 69 and 69' of the output transformer 71 comprise alternate positive and negative going pulses, such as illustrated in the block diagram of FIGURE 1.

The condition in which it is desirable to operate the pulse width modulator is normally that in which full 180 degree condition is alternately obtained in each half of the push-pull system in the absence of input to the D.-C. amplifier 15 controlling the D.-C. bias to the pulse width modulator. As the temperature changes, however, changes are caused in the angle of conduction due to changes in the cut off potential bias in the transistors, or other switchable elements, used in the pulse width modulator. A small forward temperature-dependent biasing potential is therefore maintained on the bases 56, 56' of the distorter transistors and on the bases 73, 73' of the pulse width modulator by means of a voltage divider network comprising a series resistor 67 and a transistor 68, connected as a diode, which series combination is connected across the source of negative supply potential 29. The junction between the series connected resistor and transistor is connected to the tap of the transformer winding 41 in the oscillator output circuit. This temperature-dependent biasing potential prevents undesired changes in the angle of conduction of the pulse width modulator under conditions of changing operating temperatures. Obviously, the transistor 68 may be replaced with a diode having suitable thermal-dependent properties.

The use of a backward biasing potential applied to the transistors for a mode of operation corresponding to the switching mode operation, comprises one important feature of my invention. Obviously, a backward bias may be used in either a base driven transistor, as shown, or in an emitter driven arrangement, for this mode of operation. As mentioned above, the inverter from the distorter 11 to the power amplifier 17 includes stages of transistors provided with a sufficient backward bias for switching mode of operation, thereby to assure cut off during dwell periods at all temperatures within the design objective. The use of such operating mode results in an inverter which may approach an overall efficiency of ninety (90) percent or higher which is much greater than many contemporary inverters which operate at a maximum of about seventy (70) percent efficiency.

Continuing, now, the description of the inverter, the pulses from the distorter transformer output windings 69, 69' are added to the oscillator sine wave output and the feedback voltage from the windings 43, 43' (obtained from lead wires 46 and 46') and fed through lead wires 72 and 72' to the bases, or control electrodes, 73 and 73' of transistors, or semi-conductor devices, 74 and 74', respectively, in the pulse width modulating stage 12. In addition to the temperature compensating biasing potential maintained on the bases 73 and 73' (by means of the lead wire from the junction between the resistor 67 and diode connected transistor 68, winding 41, lead wires 42 and 42', feedback windings 43 and 43', lead wires 46 and 46', and the transformer secondary windings 69 and 69'), and lead wires 78' and 78'', the pulse width modulator transistors are operated with a manually adjustable, backward bias applied to the emitters, or common electrodes, 76 and 76' of the transistors 74 and 74'. It will be seen that the emitters are connected together and through a series biasing resistor 77 to the movable arm 78 of a potentiometer 79 contained in a voltage divider network which includes the series connected potentiometer 79 and a resistor 81 across the negative supply potential 29. A backward bias which is variable by adjustment of the movable arm 78 of the potentiometer 79 is applied to the emitters 76 and 76'. The potentiometer 79 is adjusted for a 180 degree angle of conduction for each half of the push-pull system in the absence of a D.-C. feedback signal from the D.-C. amplifier 15. Obviously, the potentiometer may be replaced with suitable fixed resistor components.

In addition to the above described manually adjustable backward biasing potential applied to the emitters 76 and 76', the emitters are provided with a controllable backward bias by means of a connection through a diode 82 to the collector 83 of a transistor 84 contained in the D.-C. amplifier 15. A shunt resistor 85 is connected between the movable arm 78 of the manually adjustable biasing network, and the collector 83 of the controllable biasing network. The D.-C. signal to the amplifier 15 is derived from suitable feedback arrangements including the rectifier network 14 (described below) through lead wires 86 and 87 connected across the transistor base 88 and emitter 89. The emitter 89 of the D.-C. amplifier transistor is connected to the junction between a pair of resistors 91 and 92 which comprise a voltage dividing network connected across the negative supply 29. The feedback signal from the lead wires 86 and 87 is amplified by the transistor 84, and the output therefrom obtained from the collector 83. The diode 82 in the output circuit of the amplifier 15 prevents the amplifier output from effecting the backward bias on the emitters 76 and 76' in the pulse width modulating circuit until a predetermined minimum feedback signal is applied to the D.-C. amplifier.

The collectors, or output electrodes, 93 and 93' of the pulse width modulator transistors 74 and 74' are connected in a push-pull arrangement to the ends of a center-tapped primary winding 94 of an output transformer, or load circuit means, 96. The center tap of the transformer in the output circuit is connected to the negative supply source 29 through a current limiting resistor 97. As described above, the input to the pulse width modulator 12 includes the generally sine wave output from the oscillator 10, and the generally truncated tops and bottoms of a sine wave separated by substantially zero output and supplied by the distorter 11, which is combined in a series aiding relation and fed to the bases 73 and 73' of the pulse width modulator transistors. The combined input to the pulse width modulator, therefore, comprises an alternating voltage which is of increased steepness in the vicinity of the positive and negative peaks as compared to a sine wave. With such input pulses, the pulse width of the pulse width modulator output is accurately and easily controlled down to small angles of a few degrees by the backward D.-C. bias applied thereto.

Obviously, other means may be utilized for the production of input pulses for the pulse width modulator which pulses are of increased steepness in the vicinity of the positive and negative peaks as compared to a sine wave. For example, the output from the saturable core type peaking transformer may be applied in phase and series aiding to the input source of substantially sine wave alternating voltage, the added output of such voltages being used as the alternating current input to the pulse width modulator. Another means of obtaining a favorable input voltage waveform from the pulse width modulator includes applying a substantially sine wave input voltage to a bi-stable device or limiting amplifier, the substantially square wave output of which is fed to an integrating circuit; the output of such integrating circuit having an alternating waveform substantially triangular in shape. Such triangular-shaped waveform is another suitable input for the pulse width modulator having a controllable backward D.-C. bias. It will be understood that although the use of such waveform of increased steepness in the vicinity of the positive and negative peaks as an input to the pulse width modulator forms one important feature of my invention, such pulse width modulator input waveform is not essential to the operation of the inverter. Thus, the input to the pulse width modulator may comprise only the sine wave output from the oscillator 10. Obviously, accurate control of the pulse width of the pulse width modulator output is more difficult when the input to the modulator comprises a generally undistorted sine wave instead of a distorted sine wave input of the type described above.

The pulse width modulator output pulses of accurately controlled width are obtained from the ends of the center-tapped secondary winding 98 of the transformer 96, and applied directly to the bases 99 and 99' of the transistors 101 and 101', respectively, in the limiter amplifier 16. Transformer load resistors 102 and 102' are connected between the respective transistor bases 99 and 99' and the center tap of the secondary winding 98. The center tap on the secondary winding 98 is grounded through the lead wire 100. A parallel connected diode 104 and capacitor 106 connects the emitters 108 and 108' of the transistors 101 and 101' to the common ground through the lead wire 100 to provide cut-off bias in the absence of input during the dwell period between successive positive and negative going pulses from the pulse width modulator. If desired, the diode 104 and capacitor 106 arrangement may be replaced with a suitable parallel resistor-capacitor combination to form a self-biasing arrangement. With either capacitor-diode arrangement shown, or the capacitor-resistor arrangement described, the components of proper value are chosen to insure maintenance of a cut-off bias on both sides of the limiter amplifier push-pull system during the dwell period up to the highest operating temperature at which the apparatus is designed to operate. Runaway in the limiter amplifier is thereby prevented.

The output from the transistor 101, taken from the collector 109, is joined to one side of the primary winding 111 of preferably air gapped transformer 112, while the output from the transistor 101' is taken from the collector 109' and connected to one side of the primary winding 111' of a transformer 112' similar to transformer 112. The two free ends of the transformer primary windings are connected together. Transformers 112 and 112' are each driven one way only by transistors 101 and 101', respectively. In order that the magnetic cores of these transformers may be demagnetized sufficiently after one drive period before the arrival of succeeding drive pulses, an air gap is preferably included in the magnetic circuit thereof. During the drive period energy is stored in the transformers which would normally cause relatively high transient voltages at the moment of cutoff of the drive transistors. Such transient voltages developed across the transistors 101 and 101' (when the transistors are switched to the off condition) are controlled by the series connected resistor 123 and diode 125 connected across the primary winding 111 of the transformer 112, and the series connected resistor 124 and diode 125' connected across the transformer primary winding 111' of the transformer 112'. Failure of the transistors 101 and 101', due to excessive transient voltages, is prevented by the above series connected resistor and diode combinations across the transformer primary windings.

A variable supply potential, in accordance with my invention, is supplied to the collectors 109 and 109' of the transistors 101 and 101' through a lead wire 113 connected to the common point of the primaries 111 and 111' of the transformers 112 and 112'; the supply potential varying directly in relation to the power demands on the inverter. Thus, it will be understood that whereas the pulse width is accurately controlled in the pulse width modulator, the drive power for the power amplifier 17 is controlled at the limiter amplifier 16 by means of the variable supply potential thereto, the source of such variable supply potential being described in detail hereinbelow.

The power amplifier 17 comprises one, or more, push-pull amplifier arrangements. With more than one push-pull amplifier arrangement, such as illustrated in the drawings, wherein two (2) are shown, the outputs therefrom are connected in parallel. Separate inputs for each of the power transistors 116 and 116', and 117 and 117' are obtained from separate transformer secondary windings, designated 118, 118', 119 and 119', respectively, of the transformers 112 and 112' which inputs are applied to the respective bases 121 and 121', and 122 and 122'. The common junction between the transformer secondary windings is connected to ground through a lead wire 128. The individual transistor emitters 131, 131' and 132, 132' are also connected together, and to the common ground through the lead wire 128. The use of separate transformers 112 and 112' in the input circuit of the power amplifier 17 for individually driving the two halves of the push-pull amplifier arrangement, rather than a single transformer having center-tapped primary and secondary windings, forms another important feature of my invention. It will be understood that during the relaxation period, corresponding to the off conditions of the transformers 112 and 112', a reverse voltage decaying approximately exponentially is available across the secondaries of the individual transformers to provide a reverse bias for the power amplifier transistors to prevent runaway of the power amplifier. The duration and initial magnitude of the reverse bias may be controlled by the value of resistances 123 and 124 and diodes 125 and 125' shunted across the windings 111 and 111' of the transformers 112 and 112'.

The transistor collectors 133, 133' and 134, 134' connect to transformer primary windings 136, 136' and 137 and 137', respectively, of the power output transformer 44. The negative source of potential 29 is connected to the transistor collectors of the power amplifier through the respective primary windings of the transformer 44 and a primary winding 138 of an inductor 139. In accordance with my invention, the inductor 139 is provided with a secondary winding 141 connected in series with a rectifier 142, which series combination is connected across the negative source of potential 29. The direction of connection of the secondary winding 141 and the direction of forward current flow of the rectifier 142 is such that the energy stored in the winding 138 in series with the source of potential 29 at the instant the current through the power amplifier transistors is interrupted, is fed back to the power source 29. The operation of the power amplifier 17, which includes the inductor 139 and rectifier 142 in a novel feedback arrangement, is described in detail below.

Continuing, now, the description of the inverter circuit, the secondary winding 143 of the power output transformer 44 is tuned to the desired output frequency (which in the illustrated embodiment, is 400 cycles per second) by the output circuit 13 which includes a capacitor 144 connected in parallel with the secondary winding. The inverter output from the output circuit is connected through a primary winding 146 of a current transformer 147 to two of the three inverter output terminals 148, 149 and 150. The outputs from the other two phases of the three phase circuit are suitably connected to the inverter output terminals to provide a three phase output therefrom.

An approximately square wave alternating current is developed at the output transformer 44, which wave consists of the fundamental frequency of 400 cycles and harmonic frequencies. (Since the inverter system shown is of the balanced push-pull type, only the odd harmonic frequencies are present.) The parallel tank circuit which includes the secondary winding 143 and output circuit 13 offers a high impedance to currents of the fundamental frequency and, at the same time, offers a low impedance to currents of harmonic frequency.

In accordance with my invention, the harmonic frequency voltages at the inverter output are reduced to a suitably low value by use of the output circuit 13 connected in parallel with the secondary winding 143. The output circuit 13 shown, includes a plurality of series connected inductive and capacitive elements, designated generally 152, 152' and 152'', which are joined in parallel circuit connection across the transformer secondary winding, or inductor, 143. The series connected elements 152, 152' and 152'' are resonant at substantially the respective harmonic frequencies, which, in the arrangement illustrated, would be the third, fifth and seventh harmonic. Each harmonic current is reduced to any desired minimum value by the proper selection of capacitor and inductor in the tuned series connected elements. At the fundamental, or desired frequency, the elements 152, 152' and 152'' appear to be capacitive. The combined capacitive impedance of the elements 152, 152' and 152'' and the capacitor 144 is chosen to provide a parallel resonant circuit in conjunction with the inductor, or transformer secondary winding 143, which circuit is resonant at the fundamental frequency. With suitable series tuned elements 152, 152' and 152'', it will be understood that the need for the capacitor 144 may be removed. The values of the tuned elements may be calculated by considering the total harmonic current at the frequency to which such element is tuned and arranging that the harmonic voltage produced across the termination of such element shall be as low as is required. With my novel arrangement, the impedance of the output circuit may be reduced to any desired extent at frequencies other than the fundamental frequency, with parts of relatively low size and weight compared with what would be required with a simple parallel-resonant tank circuit, having the same impedance at the fundamental frequency. Furthermore the efficiency of the system is substantially increased since the circulating, or oscillating, volt-amperes in the output circuit are small compared with that which would exist in a simple parallel-resonant tank circuit for equal harmonic rejection. In addition, the arrangement here described is equally effective in attenuating harmonic voltages which would be produced by harmonic currents taken by non-linear loads such as transformer rectifier combinations.

It will be understood, that the novel output circuit of my invention is not limited to the use of three series connected elements 152, 152' and 152'', as illustrated since, obviously, one or more may be utilized. Furthermore, the tank circuit may include a separate inductor instead of an inductor which comprises the secondary winding of a transformer. Thus, in simplest terms, the output circuit of my invention may comprise a parallel-resonant tank circuit which includes an inductor and a series connected capacitor and inductor in parallel therewith, which tank circuit is tuned to substantially the fundamental frequency while the series connected inductor and capacitor are tuned to substantially any desired harmonic frequency which it is desired to attenuate in the output thereof.

As mentioned above, it is undesirable to supply the power amplifier 17 with the maximum driving power available at times that the power output requirements of the inverter are less than maximum. It is desired, therefore, to vary the driving power to the power amplifier in accordance with the level of output power. To this end, I include the transformer 147 having the primary winding 146 in series with the inverter output, whereby the current through the winding 146 varies directly with the inverter output current. One center-tapped secondary winding 156 feeds the rectifier network 18, which includes a pair of diodes 157, 157'; the center tap of the secondary winding 156 being directly connected to the negative supply source 29. The output from the rectifier network 18 at the lead wire 113 includes the sum of the negative supply potential and rectified output from the transformer secondary winding 156. A filter capacitor 158 is connected between the lead wire 113 and the negative supply source 29. The combined potential at the lead wire 113 provides a D.-C. supply to the limiter amplifier transistors. Thus, the limiter amplifier output, and consequently the drive to the power amplifier 17, varies directly with the output current demands from the inverter.

In order to stabilize the output voltage available from the power amplifier 17, a tapped secondary winding 161 is provided on the power output transformer 44. Obviously, the voltage developed at the secondary winding 161 is proportional to the output voltage of the power amplifier. A potentiometer 162 is connected across a portion of the said secondary winding whereby an adjustable voltage proportional to the output voltage of the power amplifier is obtained across the lead wire 163 from one end of the secondary winding 161 and the movable arm 164 of the potentiometer. In prior art arrangements, this output voltage is rectified, filtered and used in some form of automatic gain control mechanism to control the drive to the power amplifier. Such prior art arrangements do not, however, provide adequate voltage control in systems wherein the power amplifier output current demands vary over a wide range. In accordance with my invention, therefore, an additional secondary winding 116 is provided on the current transformer 147, which winding is in series circuit connection with the winding 161 through a potentiometer 166' connected thereacross. The output from the winding 166 (which is proportional to the output current demands of the power amplifier) is added to the output from the secondary winding 161 (which is proportional to the voltage output of the power amplifier) and the combined voltage is fed to a Zener diode 167 and rectifier 168 of the rectifier network 14. The combined rectified output of the windings 161 and 166 is fed to a filter network which includes a shunt input capacitor 173, series resistor 174, and shunt output capacitor 176. A load resistor 173' in shunt with the capacitor 173 provides a discharge path for the capacitor. With the Zener diode 167 connected in series with the combined rectified output from the windings 161 and 166, it will be understood that substantially no D.-C. voltage is fed to the filter network from the rectifier 168 until the said combined output reaches a predetermined value depending upon the Zener diode used. As soon as such predetermined value is reached, further increase in load voltage will produce a relatively rapid increase in the D.-C. output from the filter network, which filter output is connected to the leads 86 and 87, thereby providing an input to the D.-C. amplifier 15, which, in turn, sets the backward D.-C. bias on the pulse width modulator transistors. By including the current transformer secondary winding 166 in series with the potential winding 161, much greater accuracy of control of the output voltage from the power amplifier is possible under conditions of widely varying load current, than if only the voltage winding 161 alone is used, as in prior art devices.

In accordance with my invention, an additional secondary winding 169 may be provided on the current transformer 147. The output from this winding is rectified by rectifiers 171 and 172 in the rectifier network 14, and connected in parallel to the rectified output from the series connected secondary windings 161 and 166. The rectified output from the winding 169, therefore, is connected to the transistor 84 in the D.-C. amplifier 15 through the Zener diode 167 and filter network, as is the combined rectified output from the windings 161 and 166. Assuming that the output voltage is sufficiently low such that the combined voltage of the windings 161 and 166 is below the Zener voltage of the diode 167, substantially no voltage is supplied to the filter network of the resistors 173' and 174 and capacitors 173 and 176 until the output load current rises sufficiently towards a predetermined dangerous value. Further increase in load current will produce a sufficient voltage at the secondary winding 169 to cause the Zener diode 167 to conduct. As before, upon conduction of the Zener diode, the voltage across the filter network increases rapidly whereupon the automatic gain control circuitry functions to increase the backward D.-C. bias on the pulse width modulator circuit 12. The width of the output pulses from the pulse width modulator, and consequently the drive to the power amplifier is reduced thereby preventing the latter from being damaged by excessive output load currents.

The control of transient voltages which may be excessive is an important consideration in the design of the inverter of my invention, since such excessive transient voltages, if not controlled, may result in failure of the apparatus. In accordance with my invention, novel transient voltage protection arrangements are included in both the power amplifier 17 output circuit and the D.-C. input to the inverter, which arrangements provide an input signal to the D.-C. amplifier 15 through the Zener diode 167 and above-described filter network whenever excessive transient voltages appear at the power amplifier output or in the D.-C. input to the inverter. The transient voltage protection arrangement in the power amplifier output circuit includes the series connected capacitor 181 and primary winding 182 of a transformer 183, which are connected across the output electrodes, namely, the emitter and collector electrodes, of any of the power amplifier transistors. In the schematic drawing, the series capacitor and transformer primary winding are shown connected between the emitter 132' and collector 134' of the power amplifier transistor 117'. One end of the secondary winding 184 of the transformer 183 is connected through lead wire 186 and a diode 187 in the rectifier network 14 to one end of the Zener diode 167, while the other end of the secondary winding is connected through lead wire 188 to the input of the filter network which includes the resistors 173' and 174 and the capacitors 173 and 176. Thus, it will be understood that any transient voltage in the power amplifier output circuit will produce a voltage at the transformer 183 which is rectified, filtered, and fed to the input of the transistor 84 in the D.-C. amplifier 15 through the Zener diode 167. If the transient voltage is of sufficient magnitude, the automatic gain control circuitry functions to increase the backward D.-C. bias on the pulse width modulator 12 to reduce the width of the output pulse therefrom and thereby reduce the drive to the power amplifier.

Transient voltages of several hundred percent of rated voltage, for several milliseconds duration, are commonly encountered in the supply potential source 29 employed in aircraft, and the like. The transient voltage protection arrangement in the D.-C. power input circuit of the inverter includes a series connected capacitor 191 and primary winding 192 of a transformer 193, which are connected across the potential supply 29. It will be noted that the series connected elements are located at the input end of a conventional line filter network which includes a series connected inductor 194 and shunt capacitors 196 and 196' whereby transient potentials are sensed prior to the filtering thereof. One end of the secondary winding 197 is connected through lead wire 198 and diode 199 in the rectifier network 14 to one end of the Zener diode 167, while the other end of the secondary winding is connected through the lead wire 188 to the input of the filter network which includes the resistors 173' and 174 and the capacitors 173 and 176. Any transient voltage condition in the supply potential 29 produces a voltage at the transformer 193 which is rectified, filtered, and fed to the input of the transistor 84 in the D.-C. amplifier 15, through the Zener diode 167. Again, if the transient voltage of the supply is of sufficient magnitude, the automatic gain control circuitry functions to increase the backward D.-C. bias on the pulse width modulator 12 to reduce the width of the output pulses therefrom and thereby reduce the drive to the limiter and power amplifiers.

The inductor, or swinging choke 139 in the power amplifier circuit 17 is provided with a novel core construction, in accordance with my invention, which construction is seen in the sectional view of FIGURE 3. Referring, then, to FIGURE 3, the inductor 139 therein shown includes a winding, or windings, designated 139' (which may comprise the windings designated 138 and 141, in FIGURE 2). The magnetic circuit comprises two cores 200 and 200' of magnetic material, which are shown as being of a U or C shape. Each core is provided with a different length gap, the gap 201 in the core 200 being shown smaller than the gap 201' in the core 200'. Hence, it will be understood that the one magnetic path which includes the relatively short gap, provides the inductor with a relatively high inductance with low values of D.-C. current through the winding 139'. Due to the relatively longer gap 201', in the other core 200', the inductance thereof remains relatively low with the low values of D.-C. current through the winding 139'. As the D.-C. current through the winding 139' increases to a sufficiently high value, the first magnetic path, or core, 200 saturates, or approaches saturation such that the inductance decreases. With suitable gapping, however, the second core 200' produces the desired inductance at the higher values of D.-C. current through the inductor winding. If desired, other magnetic circuits linking the winding 139' may be included having gap lengths between those in the cores 200 and 200' to determine the inductance between the inductance at the lowest and highest D.-C. currents, within the requirements of the system. It will be apparent to those skilled in this art, that cores of other design and shape may be utilized in the inductor. The essential feature of my novel core construction comprises the provision of parallel magnetic paths, which contribute different inductances at different values of current through the inductor windings, or winding. Obviously, any desired number of windings may be included in the inductor construction of FIGURE 3.

In the inverter circuit of FIGURE 2, which includes the inductor 139 embodying my invention, first and second windings 138 and 141 are included therein. For minimum leakage inductance, the inductor 139 is preferably quadri-filar wound with section 138 consisting of two such wires in parallel and winding 141 consisting of two such wires in series.

It will be understood that the power amplifier transistors which operate in a switching mode, function as synchronous "switches" in the conversion of D.-C. power from the supply source 29 to A.-C. power at the output transformer 44. Any "switch," and particularly the transistor switching devices of the power amplifier are limited as to the amount of current which may be drawn therethrough. Since a substantially sinusoidal waveform is desired at the output of the transformer 44, it will be apparent that a generally sinusoidal primary E.M.F. is required at the primary windings 136, 136' thereof. The D.-C. supply potential 29 is of substantially a constant potential whereby the actual current flow through the current limited transistors 116, 116' and 117, 117', would vary from moment to moment as the sinusoidal voltage at the primary windings 136, 136' changed relative to the D.-C. supply potential applied alternatively to the two halves of the said primary. In order to utilize any of the current limited switching devices, it is common prior art practice to include an inductor in series with the switches, or in series with the D.-C. supply potential. Such series inductor corresponds to the inductor winding 138 of the inductor 139. The series inductor stores the magnetic energy, represented by the difference in voltage between the rectangular waveform which would be represented at the transformer primary winding by the D.-C. source of supply in the absence of such feed conductor, and the substantially sinusoidal wave form represented at the primary winding due to the sine wave output voltage at the transformer secondary winding. Such a series inductance arrangement is suitable, however, only when the transition time of the switching arrangement is negligible compared to a period of alternation. Under these conditions, the current drawn by the transistors is only slightly pulsating. When the switching time is more than negligible, and becomes a noticeable portion of the period of a cycle of operation, it will be understood that high transient voltages may be developed across the series inductor winding 138 at the moments when the current flowing in the inductor winding is suddenly interrupted by the switching transistors. This high transient voltage is fed through the transformer primary windings 136, 136' to the switch transistors. The transistors must, therefore, break the current which has been flowing immediately prior to the breaking at the high transient voltage, which voltage may be much greater than the normal voltage appearing at the one set of switching transistors at times when the other set of switching transistors is conducting.

In order to reduce the transient voltage produced across the series inductor winding 138 under the above conditions, I include the secondary winding 141 on the inductor 139 which winding is connected in series with the rectifier 142 across the source of D.-C. supply potential 29. The direction of connection of the secondary winding and the direction of forward current flow of the rectifier are such that the energy stored in the inductor at the moment of current interruption is fed back to the D.-C. source 29. The ratio of the turns of the primary winding 138 to the secondary winding 141 of the inductor is such that the transient voltage developed across the switching transistors in the power amplifier at the moment of break is reduced to a safe value. A turns ratio of 1 to 2 between the series winding 138 and the secondary winding 141 has been found to be satisfactory.

It will be here noted that the feedback arrangement which includes the inductor 139 and rectifier 142 is not limited to use in power amplifiers utilizing transistors in the switching mode. My novel feedback arrangement may be used with "switches" of any type, including e.g., other switchable semi-conductor devices, mechanical switches, thermionic vacuum tubes, gas-filled rectifiers with control grids, or the like.

Other values of A.-C. output voltage may be obtained from suitable windings and/or taps on the output transformer 44.

It will be apparent to those skilled in the art that a suitable rectifier network may be included on the output of the inverter shown, thereby resulting in an inverter system wherein a low D.-C. potential is converted to a higher D.-C. potential.

Having now described my invention in detail, in accordance with the patent statutes, various other changes and modifications will suggest themselves to those skilled in this art. It is intended that such changes and modifications shall fall within the spirit and scope of the invention, as recited in the following claims.

I claim:

1. In an electronic apparatus, a source of D.-C. voltage, a transformer having a center-tapped primary winding and a secondary winding, a pair of semi-conductor devices each having a base, emitter and collector electrode, means connecting the ends of the primary transformer winding to the collector electrodes of the semi-conductor devices, means connecting the emitters together, means connecting the source of D.-C. voltage across the center tap on the primary transformer winding and the emitter electrodes, a variable source of D.-C. bias voltage connected between the base and emitter electrodes of each of the semi-conductor devices, an alternating current source and means connecting the said alternating current source between both of the base electrodes of the semi-conductor devices and the emitters thereof whereby an output signal is developed in the transformer secondary winding comprising alternate negative and positive going pulses smoothly controllable in width by the variable source of D.-C. bias voltage, the said positive and negative going pulses increasing in width with a change of bias voltage in one direction and decreasing in width with a change of bias voltage in the other direction.

2. The invention as recited in claim 1 wherein the alternating current source comprises a sine wave oscillator, a distorter comprising a class C amplifier and having an input from the oscillator, and means adding the oscillator output to the distorter output.

3. An electronic apparatus having a power output and comprising, a pulse width modulator having an A.-C. signal applied thereto, a D.-C. biasing potential connected to said modulator and biasing the same, and means varying the biasing potential in accordance with both the current and the voltage of the output of the apparatus.

4. The invention as recited in claim 3 wherein the means varying the biasing potential functions only when the combined current and voltage of the output of the apparatus exceeds a predetermined value.

5. An electronic apparatus having a power output and comprising, a pulse width modulator having an A.-C. signal input applied thereto, a D.-C. biasing potential connected to the said pulse width modulator, a power amplifier driven by the output from the modulator, and means varying the said biasing potential in accordance with both the current and voltage output of the apparatus.

6. The invention as recited in claim 5 wherein the means varying the biasing potential functions only when the combined current and voltage outputs of the apparatus exceeds a predetermined value.

7. The invention as recited in claim 5 wherein the means varying the bias potential includes means obtaining a D.-C. signal proportional to the current output of the apparatus, means obtaining a D.-C. signal proportional to the voltage output of the apparatus, a D.-C. amplifier having an input and output circuit, and means connecting the D.-C. signals to the input circuit of the D.-C. amplifier, the D.-C. amplifier output circuit supplying the biasing potential to the said pulse width modulator.

8. An electronic apparatus having a power output and comprising, a pulse width modulator having an A.-C. signal input applied thereto, a biasing potential connected to the modulator, the output from the pulse width modulator comprising alternate positive and negative going pulses controllable in width in accordance with the biasing potential connected to the modulator, a power amplifier having an input and output circuit, means connecting the output from the pulse width modulator to the input circuit of the power amplifier, the power amplifier output circuit including a power transformer having a secondary winding and an auxiliary secondary winding, a current transformer having a primary and secondary winding, the current transformer primary winding being connected in series circuit with the power transformer secondary winding, the current transformer secondary winding being connected in series circuit with the auxiliary secondary winding, means rectifying the output from the series connected current transformer secondary winding and auxiliary secondary winding, a D.-C. amplifier having an input and output circuit, means connecting the rectified output from the rectifying means to the input circuit of the D.-C. amplifier, the D.-C. amplifier output circuit being connected to the pulse width modulator to vary the biasing potential connected thereto in accordance with the rectified output from the rectifying means, the said positive and negative going pulses from the pulse width modulator increasing in width with a change of biasing potential in one direction and decreasing in width with a change of biasing potential in the other direction.

9. The invention as recited in claim 8 wherein the means connecting the rectified output from the rectifying means to the input circuit of the D.-C. amplifier includes a Zener diode whereby the rectified output from the rectifying means is connected to the input circuit of the D.-C. amplifier only when the rectified output reaches a predetermined value.

10. An electronic apparatus having a power output and comprising, a pulse width modulator having an A.-C. signal applied thereto, a D.-C. biasing potential connected to the said modulator and biasing the same, and means varying the biasing potential in accordance with the current output of the apparatus only when the current output reaches a predetermined minimum value, the pulse width modulator having an output comprising alternate negative and positive going pulses which increase in width with a change of biasing potential in one direction and which decrease in width with a change of biasing potential in the other direction.

11. An electronic apparatus having a power output and comprising, a pulse width modulator having an A.-C. signal input applied thereto, a biasing potential connected to the modulator, the output from the pulse width modulator comprising alternate positive and negative going pulses controllable in width with the biasing potential connected to the modulator, a power amplifier having an input and output circuit, means connecting the output from the modulator to the input circuit of the power amplifier, a current transformer having a primary and secondary winding, the current transformer primary winding being connected in series circuit with the output from the apparatus, an element which is nonconductive until a predetermined potential is applied thereto, a rectifier network, a D.-C. amplifier having an input and output circuit, means connecting the current transformer secondary winding to the input circuit of the said D.-C. amplifier through the said element which is non-conductive until a predetermined potential is applied thereto and the said rectifier network, the D.-C. amplifier output circuit being connected to the pulse width modulator to vary the biasing potential connected thereto, the said positive and negative going pulses from the modulator increasing in width with a change of biasing potential in one direction and decreasing in width with a change of biasing potential in the other direction.

12. The invention as recited in claim 11 wherein the said element which is non-conductive until a predetermined potential is applied thereto comprises a Zener diode.

13. An electronic apparatus having a power output and comprising, a pulse width modulator having an A.-C. signal applied thereto, a biasing potential connected to the said modulator and biasing the same, the output from the modulator comprising alternate positive and negative going pulses controllable in width in accordance with the biasing potential connected to the modulator, first means varying the biasing potential in accordance with both the current and the voltage of the output of the apparatus only when the combined current and voltage reaches a predetermined value, and second means varying the biasing potential in accordance with the current output of the apparatus only when the current output reaches a predetermined value, the said positive and negative going pulses from the modulator increasing in width with a change of biasing potential in one direction and decreasing in width with a change of biasing potential in the other direction.

14. In an electrical inverter, a sine wave oscillator, a distorter comprising a class C amplifier energized by an oscillator output, a pulse width modulator comprising a class C amplifier energized by the combined output of the oscillator and distorter, a source of biasing potential connected to the pulse width modulator controlling the width of pulses therefrom, a limiting amplifier driven by the output pulses from the pulse width modulator, a power amplifier driven by the output from the limiter amplifier, a source of supply potential connected to the limiter amplifier, means varying the supply potential to the limiter amplifier in accordance with the magnitude of the output current from the power amplifier, first means varying the biasing potential to the pulse former in accordance to the output current from the power amplifier when the output current exceeds a predetermined value, second means varying the biasing potential to the pulse former in accordance with the combined output current and potential of the power amplifier when the said combined output exceeds a predetermined value.

15. The invention as recited in claim 14 wherein the oscillator, distorter, pulse width modulator, limiter amplifier and power amplifier each comprise a pair of semiconductor devices each having a base, collector and emitter electrode, each of the pairs of devices being connected in a push-pull circuit arrangement.

16. An electronic apparatus having a power output and comprising, a pulse width modulator having an A.-C. signal applied thereto, a variable biasing potential connected to the said modulator and biasing the same, and means varying the D.-C. biasing potential in accordance with transient potentials in the power output of the apparatus.

17. The invention as recited in claim 16 wherein the means varying the biasing potential functions only when the transient potentials exceed a predetermined value.

18. In an electronic apparatus, an amplifier having an input and output circuit, a pulse width modulator having an input and output circuit, an A.-C. signal source connected to the input circuit of the modulator, means connecting the pulse width modulator output circuit to the input circuit of the said amplifier, a variable D.-C. biasing means connected to the said pulse width modulator and biasing the same, and means varying the biasing potential in accordance with excessive transient potentials in the amplifier output circuit.

19. An electronic apparatus energized by a D.-C. potential supply source, and including a pulse width modulator having an A.-C. signal applied thereto, a variable D.-C. biasing potential connected to the said modulator, and biasing the same, and means varying the biasing potential in accordance with transient voltage changes in the said D.-C. potential supply source.

20. The invention as recited in claim 19 wherein the means varying the biasing potential functions only when the transient voltage changes in the said D.-C. potential supply exceed a predetermined value.

21. In an electronic apparatus, a power amplifier having an input and output circuit, a pulse width modulator, having an input and output circuit, a D.-C. potential supply source connected to the power amplifier, an A.-C. signal source connected to the input circuit of the modulator, means connecting the pulse width modulator output circuit to the input circuit of the said power amplifier, a variable D.-C. biasing means connected to the said pulse width modulator and biasing the same, and means varying the biasing potential in accordance with transient voltage changes in the D.-C. potential supply source in excess of a predetermined value.

22. In an electronic apparatus, a pair of interconnected pulse width modulation circuits having respective input circuit means for receiving an alternating voltage in a push-pull manner and a variable source of D.-C. bias voltage in a push-push manner, and having respective interconnected output circuit means producing alternate negative and positive going pulses from the alternating voltage applied to the input circuit means which pulses are controllable in width by the bias voltage source, the said positive and negative going pulses increasing in width with a change of bias voltage in one direction and decreasing in width with a change of bias voltage in the other direction.

23. In an electronic apparatus, a pair of semi-conductor devices each having an output, control and common electrode, an output circuit comprising load circuit means having end terminals and a center tap, means connecting the end terminals of the load circuit means to individual output electrodes of the devices, means connecting the common electrodes together, a D.-C. supply source connected between the center tap on the load circuit means and the said common electrodes, a variable source of D.-C. bias voltage connected in the same sense between the control and common electrodes of each of the devices, and an alternating current source connected between both of the said control electrodes and the common electrodes and alternately driving the devices between conducting and non-conducting states, an output signal being developed at the output circuit comprising alternate negative and positive going pulses controllable in width by the said variable source of bias voltage, the said positive and negative going pulses increasing in width with a change of D.-C. bias voltage in one direction and decreasing in width with a change of D.-C. bias voltage in the other direction.

24. The invention as recited in claim 23 wherein the alternating current source comprises a sine wave oscillator, a distorter comprising a class C amplifier and having an input from the oscillator, and means adding the oscillator output to the distorter output.

References Cited in the file of this patent

UNITED STATES PATENTS

| | | |
|---|---|---|
| 513,425 | Scott | Jan. 23, 1894 |
| 1,467,771 | Alden | Sept. 11, 1923 |
| 2,550,127 | Specht | Apr. 24, 1951 |
| 2,666,901 | Lynn | Jan. 19, 1954 |
| 2,673,961 | Williamson | Mar. 30, 1954 |
| 2,683,852 | Sampson | July 13, 1954 |
| 2,720,622 | Deuser | Oct. 11, 1955 |
| 2,740,086 | Evans et al. | Mar. 27, 1956 |
| 2,780,782 | Bright | Feb. 5, 1957 |
| 2,816,238 | Elliott | Dec. 10, 1957 |
| 2,821,639 | Bright et al. | Jan. 28, 1958 |
| 2,824,287 | Green et al. | Feb. 18, 1958 |
| 2,847,519 | Aronson | Aug. 12, 1958 |
| 2,862,165 | Younkin | Nov. 25, 1958 |
| 2,863,008 | Keonjian | Dec. 2, 1958 |
| 2,867,779 | Bardeen et al. | Jan. 6, 1959 |
| 2,875,284 | Ehret | Feb. 24, 1959 |
| 2,875,351 | Collins | Feb. 24, 1959 |
| 2,891,726 | Decker et al. | June 23, 1959 |